(12) United States Patent
Warshavsky et al.

(10) Patent No.: US 12,437,094 B2
(45) Date of Patent: Oct. 7, 2025

(54) ACCESS CONTROLS FOR EXTERNAL DATA RECORDS

(71) Applicant: salesforce.com, inc., San Francisco, CA (US)

(72) Inventors: Alexander Warshavsky, Walnut Creek, CA (US); Cloves Carneiro Junior, Hollywood, FL (US); Adam Torman, Walnut Creek, CA (US); Brian Esserlieu, Westminster, CO (US); Carl Montgomery, Salt Lake City, UT (US); Douglas Bitting, Pleasanton, CA (US)

(73) Assignee: Salesforce, Inc., San Francisco, CA (US)

(*) Notice: Subject to any disclaimer, the term of this patent is extended or adjusted under 35 U.S.C. 154(b) by 458 days.

(21) Appl. No.: 17/575,436

(22) Filed: Jan. 13, 2022

(65) Prior Publication Data

US 2023/0092849 A1    Mar. 23, 2023

Related U.S. Application Data

(60) Provisional application No. 63/261,312, filed on Sep. 17, 2021.

(51) Int. Cl.
    *G06F 21/62*     (2013.01)
(52) U.S. Cl.
    CPC ................ *G06F 21/6218* (2013.01)
(58) Field of Classification Search
    CPC ................................................ G06F 21/6218
(Continued)

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

FOREIGN PATENT DOCUMENTS

| | | | | |
|---|---|---|---|---|
| CN | 110196923 A | * | 9/2019 | ......... G06F 16/9017 |
| WO | WO-2014207554 A2 | * | 12/2014 | ............. G06F 16/21 |

OTHER PUBLICATIONS

Kappes, Giorgos, Andromachi Hatzieleftheriou, and Stergios V. Anastasiadis. "Multitenant access control for cloud-aware distributed filesystems." IEEE Transactions on Dependable and Secure Computing 16, No. 6 (2017): 1070-1085. (Year: 2017).*

(Continued)

*Primary Examiner* — Luu T Pham
*Assistant Examiner* — Walter J Malinowski
(74) *Attorney, Agent, or Firm* — Weaver Austin Villeneuve & Sampson LLP

(57) ABSTRACT

Methods and corresponding systems and apparatuses for configuring user access to data stored in and/or accessed through an external computer system are described. Access permissions can be configured through defining a permission set relative to a proxy entity and assigning the permission set to one or more users. A proxy entity is a local representation of an external data entity. A proxy entity can be a virtual entity in that the proxy entity does not contain underlying data. A proxy entity can, however, include metadata describing its corresponding external data entity. A computer system maintaining a proxy entity can store mapping information linking the proxy entity to an external data entity. The mapping information and the permission set can be used to determine an access permission relative to the external data entity and to communicate this access permission to the external computer system so that access can be provided accordingly.

20 Claims, 10 Drawing Sheets

(58) Field of Classification Search
USPC .......................................................... 726/28
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,178,443 B1 * | 1/2001 | Lin .......................... H04L 67/10 709/227 |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 * | 5/2004 | Warshavsky .......... G06F 16/258 707/999.005 |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,447,820 B1 * | 5/2013 | Gay ....................... G06Q 10/10 709/212 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,265 B1 * | 8/2013 | Boone ................. G06F 16/1827 707/790 |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,973,106 B2 | 3/2015 | Warshavsky et al. |
| 9,628,493 B2 | 4/2017 | Warshavsky et al. |
| 9,641,880 B1 * | 5/2017 | Scurtu ................ H04N 21/4384 |
| 9,647,922 B2 | 5/2017 | Mortimore, Jr. et al. |
| 9,710,127 B2 | 7/2017 | Torman et al. |
| 9,710,514 B1 * | 7/2017 | Gole ..................... G06F 16/245 |
| 9,892,418 B1 * | 2/2018 | Barua ................. G06Q 30/0204 |
| 10,049,131 B2 | 8/2018 | Torman et al. |
| 10,223,136 B2 | 3/2019 | Torman et al. |
| 10,275,281 B2 | 4/2019 | Pradeep et al. |
| 10,296,661 B2 | 5/2019 | Sreenivasa et al. |
| 10,332,129 B2 | 6/2019 | Torman et al. |
| 10,339,126 B2 | 7/2019 | Pradeep et al. |
| 10,380,094 B2 | 8/2019 | Warshavsky et al. |
| 10,394,412 B2 | 8/2019 | Torman et al. |
| 10,592,474 B2 | 3/2020 | Torman et al. |
| 10,613,709 B2 | 4/2020 | Ready et al. |
| 10,713,066 B2 | 7/2020 | Torman et al. |
| 10,917,260 B1 * | 2/2021 | Bashyam ............... G06F 16/183 |
| 10,984,665 B2 | 4/2021 | Torman et al. |
| 11,120,702 B2 | 9/2021 | Douglas et al. |
| 11,137,883 B2 | 10/2021 | Ready et al. |

(56) References Cited

U.S. PATENT DOCUMENTS

| | | | |
|---|---|---|---|
| 11,973,870 B1* | 4/2024 | Mehta | G06F 21/1014 |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187848 A1* | 10/2003 | Ghukasyan | G06F 21/6227 707/999.009 |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0010701 A1* | 1/2004 | Umebayashi | G06F 21/6227 713/193 |
| 2004/0015942 A1* | 1/2004 | Branson | G06F 8/65 717/168 |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0026287 A1* | 2/2006 | Ternullo | G06F 9/54 709/227 |
| 2007/0180386 A1* | 8/2007 | Ballard | G06F 16/9577 715/744 |
| 2008/0184329 A1* | 7/2008 | Cross | G06F 21/6218 726/1 |
| 2008/0249972 A1 | 10/2008 | Dillon | |
| 2009/0063415 A1 | 3/2009 | Chatfield et al. | |
| 2009/0089537 A1* | 4/2009 | Vick | G06F 12/0284 711/E12.09 |
| 2009/0100342 A1 | 4/2009 | Jakobson | |
| 2009/0177744 A1 | 7/2009 | Marlow et al. | |
| 2010/0281522 A1* | 11/2010 | Hatakeyama | H04L 63/0823 726/4 |
| 2011/0218958 A1 | 9/2011 | Warshavsky et al. | |
| 2011/0219184 A1* | 9/2011 | Jaquette | G06F 3/061 707/E17.061 |
| 2011/0247051 A1 | 10/2011 | Bulumulla et al. | |
| 2012/0042218 A1 | 2/2012 | Cinarkaya et al. | |
| 2012/0233137 A1 | 9/2012 | Jakobson et al. | |
| 2012/0290407 A1 | 11/2012 | Hubbard et al. | |
| 2013/0031166 A1* | 1/2013 | Jayaraman | G06F 40/58 709/203 |
| 2013/0066672 A1* | 3/2013 | Brown | G06Q 10/0875 705/7.27 |
| 2013/0067541 A1* | 3/2013 | Itoh | H04N 1/0097 726/4 |
| 2013/0124155 A1* | 5/2013 | Miller | G06Q 10/101 703/1 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2013/0275789 A1* | 10/2013 | Wang | G06F 1/3296 713/320 |
| 2014/0359537 A1 | 12/2014 | Jakobson et al. | |
| 2015/0006289 A1 | 1/2015 | Jakobson et al. | |
| 2015/0007050 A1 | 1/2015 | Jakobson et al. | |
| 2015/0067088 A1* | 3/2015 | Guerin | H04L 67/51 709/213 |
| 2015/0095162 A1 | 4/2015 | Jakobson et al. | |
| 2015/0106736 A1 | 4/2015 | Torman et al. | |
| 2015/0142596 A1 | 5/2015 | Jakobson et al. | |
| 2015/0172563 A1 | 6/2015 | Jakobson et al. | |
| 2015/0220586 A1* | 8/2015 | Zak | H04N 5/76 707/783 |
| 2016/0188617 A1* | 6/2016 | Gaikwad | G06F 21/6218 707/785 |
| 2017/0161973 A1* | 6/2017 | Katta | G06Q 40/08 |
| 2017/0185563 A1* | 6/2017 | Underwood | G06F 3/0659 |
| 2017/0201588 A1* | 7/2017 | Schmidt | H04L 63/105 |
| 2017/0293766 A1* | 10/2017 | Schnjakin | G06F 21/602 |
| 2017/0310549 A1* | 10/2017 | Nagesh | H04L 41/0895 |
| 2018/0025096 A1* | 1/2018 | Iizawa | H04N 21/4331 709/202 |
| 2018/0025113 A1 | 1/2018 | Torman et al. | |
| 2018/0095396 A1* | 4/2018 | Sun | G06F 3/1231 |
| 2018/0096012 A1 | 4/2018 | Warshavsky et al. | |
| 2018/0096020 A1 | 4/2018 | Sreenivasa et al. | |
| 2018/0096024 A1 | 4/2018 | Bitting et al. | |
| 2018/0096127 A1 | 4/2018 | Purkiss et al. | |
| 2018/0096130 A1 | 4/2018 | Purkiss et al. | |
| 2018/0096165 A1 | 4/2018 | Warshavsky et al. | |
| 2018/0205739 A1* | 7/2018 | Sommerfelt | G06F 21/6218 |
| 2018/0317085 A1* | 11/2018 | Gujjar | H04L 63/107 |
| 2019/0188408 A1* | 6/2019 | Glik | G06F 21/6218 |
| 2019/0196741 A1* | 6/2019 | Guillen | G06F 3/067 |
| 2019/0332696 A1* | 10/2019 | Chen | G06F 16/2471 |
| 2020/0183801 A1* | 6/2020 | LeCrone | G06F 3/0647 |
| 2020/0195645 A1* | 6/2020 | Wei | H04L 9/3268 |
| 2020/0293342 A1 | 9/2020 | Torman et al. | |
| 2020/0364953 A1* | 11/2020 | Simoudis | G06N 20/00 |
| 2020/0401316 A1* | 12/2020 | Hankins | G06F 12/0868 |
| 2021/0150483 A1 | 5/2021 | Carlberg et al. | |
| 2021/0203503 A1* | 7/2021 | Soundararajan | G06F 21/6218 |
| 2021/0234673 A1* | 7/2021 | Kurian | H04L 9/3234 |
| 2021/0294532 A1* | 9/2021 | Kim | G06F 3/0635 |
| 2021/0342309 A1* | 11/2021 | Madhipatla | G06F 16/188 |
| 2021/0342738 A1* | 11/2021 | Sarferaz | G06Q 10/10 |
| 2021/0358320 A1 | 11/2021 | Douglas et al. | |
| 2022/0012363 A1* | 1/2022 | Colcord | G06F 16/2457 |
| 2022/0256371 A1* | 8/2022 | Lekutai | H04L 43/50 |
| 2022/0407866 A1* | 12/2022 | Tanutama | H04L 63/108 |
| 2023/0004669 A1* | 1/2023 | Langseth | G06F 16/258 |

OTHER PUBLICATIONS

Zichichi, Mirko, Stefano Ferretti, Gabriele D'Angelo, and Víctor Rodríguez-Doncel. "Personal data access control through distributed authorization." In 2020 IEEE 19th International symposium on network computing and applications (NCA), pp. 1-4. IEEE, 2020. (Year: 2020).*

Wei, Xianmin. "Design and Implementation of Rights Management System Based on RBAC Model." In 2011 International Conference on Computer and Management (CAMAN), pp. 1-4. IEEE, 2011. (Year: 2011).*

Šimundić, Slavko, Siniša Franjić, and Tihomir Sušić. "Databases and computer crimes." In Proceedings ELMAR-2010, pp. 195-201. IEEE, 2010. (Year: 2010).*

(56) References Cited

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

ACCESS CONTROLS FOR EXTERNAL DATA RECORDS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to configuring user access to data stored in and/or accessed through an external computer system.

BACKGROUND

Access management involves controlling user access to computing resources (e.g., stored data) and can include authentication functionality (verifying user identity) as well as authorization functionality (granting user access to resources). While an enterprise organization may rely on a single service provider to provide a bundle of computing services, it is not always possible for services to be hosted in a centralized manner. When services are hosted in a distributed fashion, it can be challenging for a service provider that provides access management to also manage access to resources controlled by a different service provider. For instance, a first service provider may be configured to provide an administrative user with the ability to set permissions for data residing in a database maintained by the first service provider, but the first service provider may have limited control over and/or visibility into a database managed by a second service provider on behalf of the same customer.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to implementations by one skilled in the art without departing from the spirit and scope of the disclosure.

DETAILED DESCRIPTION

Figure 1:
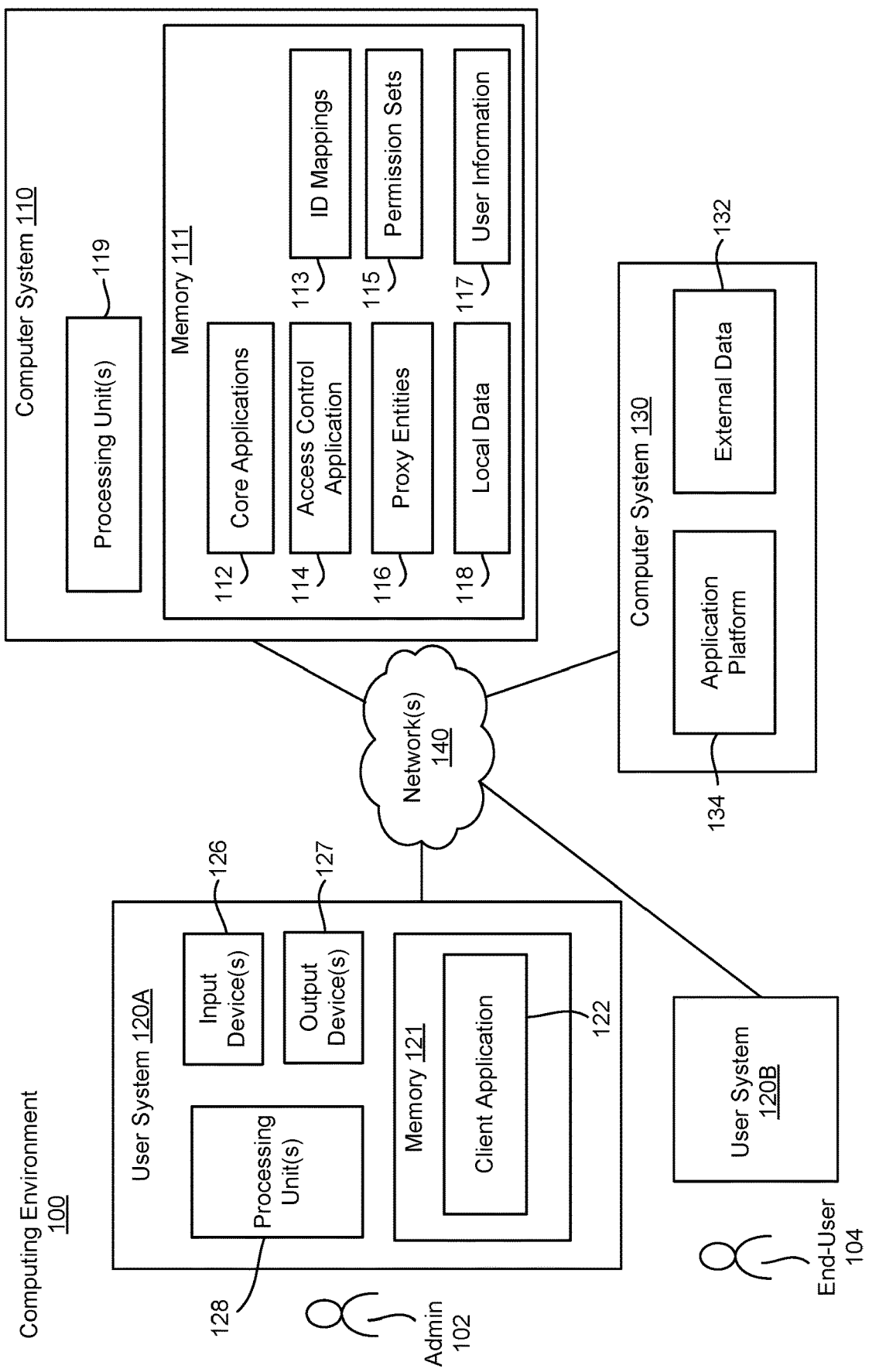
FIG. 1 shows a block diagram of an example computing environment incorporating one or more implementations.

Examples of systems and methods for configuring user access to data are described herein with reference to certain implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer-readable medium such as a non-transitory computer-readable storage medium containing computer-readable instructions or computer program code, or as a computer program product comprising a computer usable medium having a computer-readable program code embodied therein.

Aspects of the present disclose relate to providing access controls for configuring user access to data stored in and/or accessed through an external computer system. One way to manage access to external data is to duplicate the external data in a local computer system, for example, through copying the external data into a local database. Access management can then be performed with respect to the local copies, but this method can be problematic because it may require keeping the local data and the external data synchronized. Further, because the local data and/or the external data may be updated over time, for example, by users with access to such data, control logic for determining which version, local or external, of the data is controlling may be required. In some cases, there may not be a single source of truth, making it difficult to determine which version controls.

As an alternative to creating local copies, example implementations described herein provide for configuration of access to external data through creation of proxy entities. In some implementations, a computer system provides an administrative user with the ability to configure user access to external data records via a user interface that permits the administrative user to specify access permissions relative to proxy entities that are maintained or managed by the computer system. The proxy entities have identifiers (IDs) that can be mapped to IDs of the external data entities to link the proxy entities to their corresponding external data entities.

The proxy entities are not one-to-one copies but are instead local representations of external data. For example, a proxy entity can be a virtual entity containing metadata describing a corresponding external data object or collection of data objects. Permissions can be configured with respect to the proxy entities through a user interface provided by the local computer system. Since the underlying data is external, enforcement of access restrictions can be performed by an external computer system based on access permission information communicated to the external computer system by the local computer system.

FIG. 1 shows a block diagram of an example computing environment 100 incorporating one or more implementations. The computing environment 100 includes a first computer system 110, user systems 120A and 120B, and a second computer system 130. Each of the user systems 120A, 120B is a computer system that includes a computing device (e.g., a laptop, a desktop, a smartphone, a tablet, etc.). The user system 120A is operated by a first user (an administrator 102). The user system 120B is operated by a second user 104 (an end-user 104). The user system 120A and the user system 120B may each include components of a general-purpose computer. The discussion of the components which form the user system 120A generally also applies to the user system 120B. FIG. 1 is merely an example with a single administrator and a single end-user. In practice, there may be multiple administrators, and each administrator may configure permissions for multiple end-users, including individual end-users as well as groups of end-users.

As shown in FIG. 1, the computer system 110, the computer system 130, and the user systems 120A, 120B are communicatively intercoupled through one or more networks 140. The network(s) 140 may include one or more wireless networks, one or more wireline networks, or a combination of wired and wireless networks. For example, a network 140 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

When implemented using a TCP/IP network, the network(s) 140 may support the execution of web-based applications by the computer system 110 and/or the computer system 130 on behalf of the user system 120A and the user system 120B. Such applications may include a set of core applications 112 residing in a memory 111 of the computer system 110. The core applications 112 may be remotely operated by users associated with one or more tenants (e.g., enterprise organizations) of the computer system 110 and, as such, may provide functionality relating to sales, customer support, customer relationship management (CRM), marketing, finance, messaging, electronic commerce, data analytics, and/or the like. Thus, the core applications 112 may form a software suite available to users of the computer system 110, e.g., on a subscription basis. In some implementations, the core applications 112 may include a learning application configured to provide user access to learning resources maintained by the computer system 130 and to track learning progress for individual users. Accordingly, the memory 111 may store user information 117, which can be in the form of user profiles that include, among other things, a user-specific history of learning resources (e.g., online courses) accessed or completed by a user. Each user may have a user profile maintained by the computer system 110. The user profile may be stored in association with a corresponding user ID. The learning resources can include resources authored or collected by users associated with a tenant and may relate to skills or competencies required for different roles within business or functional units of that tenant.

Memory 111 may further include an access control application 114 that permits an administrative user such as the administrator 102 to configure access permissions for end-users, e.g., employees of the same organization that the administrator 102 belongs to. The access control application 114 can be included as part of the core applications 112 and may be executed by the computer system 110 as part of operating an access control system that controls user access to local data 118. The local data 118 is shown as residing in the memory 111 but can, in general, be any data that the computer system 110 has direct control over. The local data 118 may include tenant-specific data that can only be accessed by users associated with the same tenant. In a multi-tenant environment, the computer system 110 may isolate the local data 118 such that users associated with one tenant have no access or visibility into local data belonging to a different tenant. Further, within a single tenant, access permissions may be configured such that permission levels vary among users.

Memory 111 can be formed by one or more memory devices, including non-volatile storage devices (e.g., read-only memory (ROM) or flash memory), volatile storage devices (e.g., random access memory (RAM)), or a combination of volatile and non-volatile memory. Memory can be distributed across memory devices that are not collocated. For example, the core applications 112 and the local data 118 may reside on servers in different data centers.

Computer system 110 may be configured to provide access to the core applications 112 and/or the access control application 114 through a Software as a Service (SaaS) model, a Platform as a Service (PaaS) model, or other cloud computing model. The computer system 110 may further include one or more processing units 119 configured to execute the core applications 112 and the access control application 114. A processing unit 119 be a Central Processing Unit (CPU) or microprocessor. Processing units 119 may also include special purpose processors such as a graphics processing units (GPU).

In addition to the local data 118, the access control application 114 can be used to configure access permissions with respect to external data 132 maintained by the computer system 130. The computer system 130 can include an application platform 134 through which the external data 132 is accessed in connection with execution of one or more software applications by the computer system 130. The application platform 134 can be a cloud-based platform on which the one or more applications are executed by the computer system 130 according to a SaaS, PaaS, or other cloud computing model. For example, the computer system 130 may host learning resources on a server or database and provide access to the learning resources through a PaaS model. The application platform 134 may implement a runtime environment for providing one or more services to a user system. Although the core applications 112 are not executed within the application platform 134, the core applications 112 may cause service requests (e.g., requests to access external data 132) to be sent to the computer system 130 for fulfillment by an application running on the application platform 134. Accordingly, from the perspective of end-users, such services may appear to be provided by the computer system 110 through functionality associated with a core application 112.

Access to the external data 132 by users of the computer system 110 can be implemented in a user-transparent manner, such that a user accessing the external data 132 is unaware of the fact that the external data resides in, or is accessed through, the computer system 130 rather than being made available directly through the computer system 110. For example, the end-user 104 may log into a learning application (e.g., one of the core applications 112) executed by the computer system 110, and the computer system 110 may direct the user system 120B to the computer system 130 in response to user interaction with the learning application that triggers access to learning resources corresponding to external data 132. In some implementations, the computer system 110 may support single-sign-on (SSO) functionality so that once a user is authenticated through logging into one application, the user is also deemed authenticated for purposes of other applications executable by the computer system 110 and/or the computer system 130.

As shown in FIG. 1, the memory 111 may further include ID mappings 113, permission sets 115, and proxy entities 116. The ID mappings 113 link the proxy entities 116 to corresponding data entities that form the external data 132. An ID mapping may provide a one-to-one linking between a local ID of a proxy entity and an external ID of an external counterpart to the proxy entity. The local ID and the external ID can have different formats. For example, the computer system 110 may be configured to assign IDs to the proxy entities 116 using a format that is different from that of IDs assigned by the computer system 130 to the external data 132.

Permission sets 115 can determine access permissions for users with respect to the local data 118 as well as the external data 132. In general, the computer system 110 may not have direct visibility into the external data 132. For example, the external data 132 may be stored in database that is accessible to the computer system 130 but not the computer system 110. In order to configure access permissions relative to the external data 132, the access control application 114 may permit configuration of permissions relative to the proxy entities 116. For instance, the administrator 102 may use the access control application 114 to define one or more permission sets and associate the one or more permission sets with a particular proxy entity.

A permission set is a collection of settings and permissions that give users access to various functionality. For example, a permission set may include a right to create data (e.g., add to an existing collection of learning resources), a right to read data (e.g., access a particular collection of learning resources), a right to run a report relating to data, and/or the like. Access permissions generally include create, read, update (edit), or delete permissions. Permission sets can also be used to limit access to specific Internet Protocol (IP) ranges (e.g., a blacklist or whitelist of IP addresses) and to implement time-based restrictions (e.g., limited hours of access). When assigned to a user, a permission set modifies the user's access rights without necessitating a change in their user profile. Thus, a user may have a single user profile but may also have multiple permission sets assigned to them. The access control application 114 may allow the administrator 102 to assign a permission set to an individual user (e.g., through associating the permission set with a specific user ID) or to a group of users. For instance, a permission set can be associated with a specific user role or job function (e.g., engineer, customer service representative, salesperson) or an organizational division (e.g., human resources, customer support, accounting).

Permission sets can be bundled into permission set groups so that assigning a permission set group to a user gives the user the combined permissions of all the permission sets in the permission set group. A permission set can also be included in more than one permission set group, allowing the permission set to be reused without having to configure duplicate permission sets. In general, permission sets can be updated at any time by an administrator or other user with authorization to set permissions. When a permission set is updated, changes to the permission set can be automatically propagated to all permission set groups that include the permission set. Individual permissions within a permission set group can be selectively disabled using a muting feature available through the access control application 114, to further customize the permission set group. Accordingly, the permission sets 115 may define different types of access by users to the local data 118 and/or the external data 132 and can be configured in a flexible manner with varying levels of granularity.

As discussed above, the external data 132 can include learning resources. Learning resources can include one or more types of educational content in the form of knowledge articles, audio files, videos, electronic presentations, interactive tests, and/or the like. An organization may include multiple business or functional units, each business or functional unit requiring a different skill set for its members. Accordingly, each business or functional unit may produce its own skill-specific learning content for consumption by its members. As an example, the end-user 104 may be a software engineer belonging to an engineering department. The external data 132 can include a collection of learning resources authored by users who belong to the engineering department. Since it may be desirable to restrict access to this collection of learning resources to users in the engineering department, the administrator 102 may configure a permission set relative to a proxy entity representing the collection of learning resources and assign this permission set to a user group representing members of the engineering department. In this manner, the collection of learning resources may be viewed or accessed by any user who is an engineer, but not by other users.

User system 120A may include one or more processing units 128. Similar to the processing units 119, the one or more processing units 128 may include one or more general purpose processors and/or one or more special purpose processors. The administrator 102 may interact with the access control application 114 through a client application 122 installed on user system 120A. The client application 122 may reside in memory 121 of the user system 120A and can be a web browser or thin-client program configured to communicate with the access control application 114 through an application programming interface (API), e.g., a web API through which Hypertext Transfer Protocol (HTTP) requests and responses are exchanged between the client application 122 and the access control application 114. Alternatively, in some implementations, the access control application 114 may be installed and executed on the user system 120A as a standalone program. The memory 121 can be implemented in a similar manner to the memory 111 and may include one or more memory devices comprising non-volatile storage, volatile storage, or a combination of volatile and non-volatile storage.

The user system 120A can include one or more input devices 126 and one or more output devices 127. Input devices 126 include, but are not limited to, keyboards, computer mice, trackballs, touchscreens, touchpads, microphones, cameras, and/or the like. Output devices 127 may include a display monitor, an image projector, a loudspeaker, an earbud, an audio headset, a motor that vibrates to provide haptic feedback, and/or the like. In some cases, such as with a touchscreen, an input device may also serve as an output device.

When executed, the access control application 114 may cause the user system 120A to present a user interface through one or more of the output devices 127. The user interface may, for example, include a graphical menu of options that are presented on a display monitor and which enable the administrator 102 to configure access permissions through creating, modifying, deleting, or assigning permission sets. The user interface of the access control application 114 may include a list of data entities that the administrator 102 can specify permissions for. The list of data entities can include local data 118 and proxy entities 116. In this manner, the access control application 114 indicates to the administrator 102 what data entities are available, including data entities corresponding to the external data 132.

User system 120B and other user systems within the computing environment 100 may be configured similarly to the user system 120A. User system 120B may, for instance, include one or more processing units, one or more input devices, one or more output devices, and memory storing applications executable by the user system 120B. The applications stored in the memory of the user system 120B may include a client application. The client application may, similar to the client application 122, be a web browser or other thin-client configured to communicate with a remotely executed application, for example, one or more of the core applications 112. Accordingly, the end-user 104 may operate the user system 120B to request services from the computer system 110, including services that involve providing the user system 120B with access to local data 118 and/or external data 132.

Figure 2:
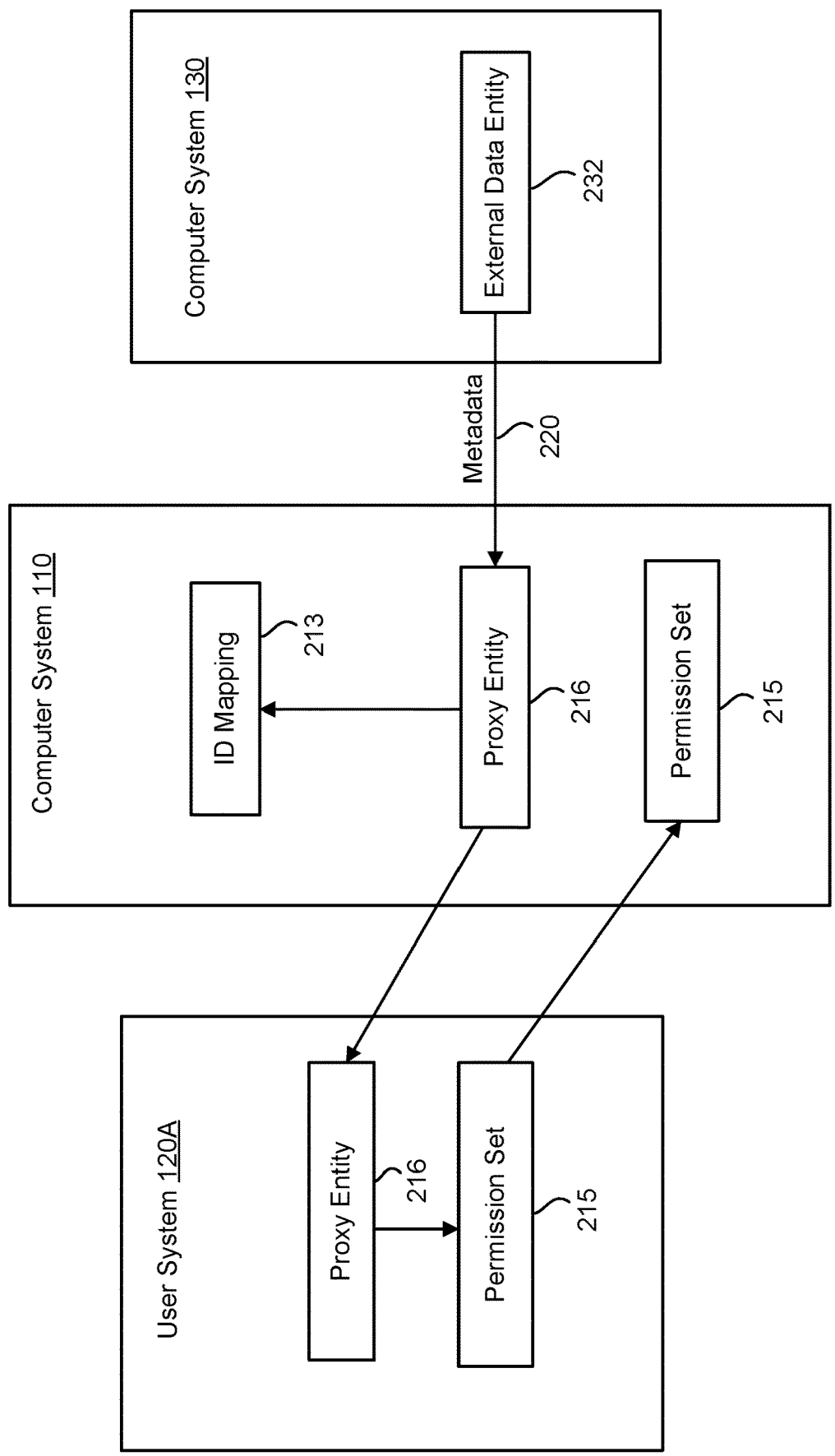
FIG. 2 illustrates relationships between local representations of data objects in an example computing environment.

FIG. 2 illustrates relationships between local representations of data objects in the computing environment 100. The computer system 130 has direct access and visibility into an external data entity 232 that forms part of the external data 132 in FIG. 1. The external data entity 232 can be a single data record or a collection of data records, referred to herein as a "content collection." For instance, the external data entity 232 may correspond to a collection of learning resources relating to a single skill or set of skills. Thus, the external data entity 232 may be a container object for related data records, where each of the data records within the container object is individually accessible. A content collection may include one or more learning modules, where a learning module comprises a set of courses or other educational content to be taken in sequence in order for a user to develop increasing levels of competency in one or more skills.

The computer system 110 does not have direct access or visibility into the external data entity 232. However, the computer system 130 can communicate information about the external data entity 232, such as metadata 220, to the computer system 110. The communication of such information may occur automatically, for example, when the external data entity 232 is created or instantiated in the computer system 130. The metadata 220 can include information describing the external data entity 232, for example, the name of the external data entity, an ID assigned to the external data entity, a list of skills the external data entity is associated with, and/or other information indicative of a purpose of the external data entity. The computer system 110 is configured to generate a proxy entity 216 and populate the proxy entity 216 using the metadata 220. As discussed above, the computer system 110 may assign a proxy entity an ID that is different from that of an external counterpart. Accordingly, the computer system 110 can generate an ID mapping 213 linking an ID of the proxy entity 216 to the ID assigned to the external data entity 232.

Once the proxy entity 216 is generated, the computer system 110 can make the proxy entity 216 visible to the user system 120A, e.g., through a user interface provided by the access control application 114. The administrator 102 can then configure one or more permission sets for the proxy entity 216, e.g., a permission set 215, and assign each permission set to one or more users.

Figure 3:
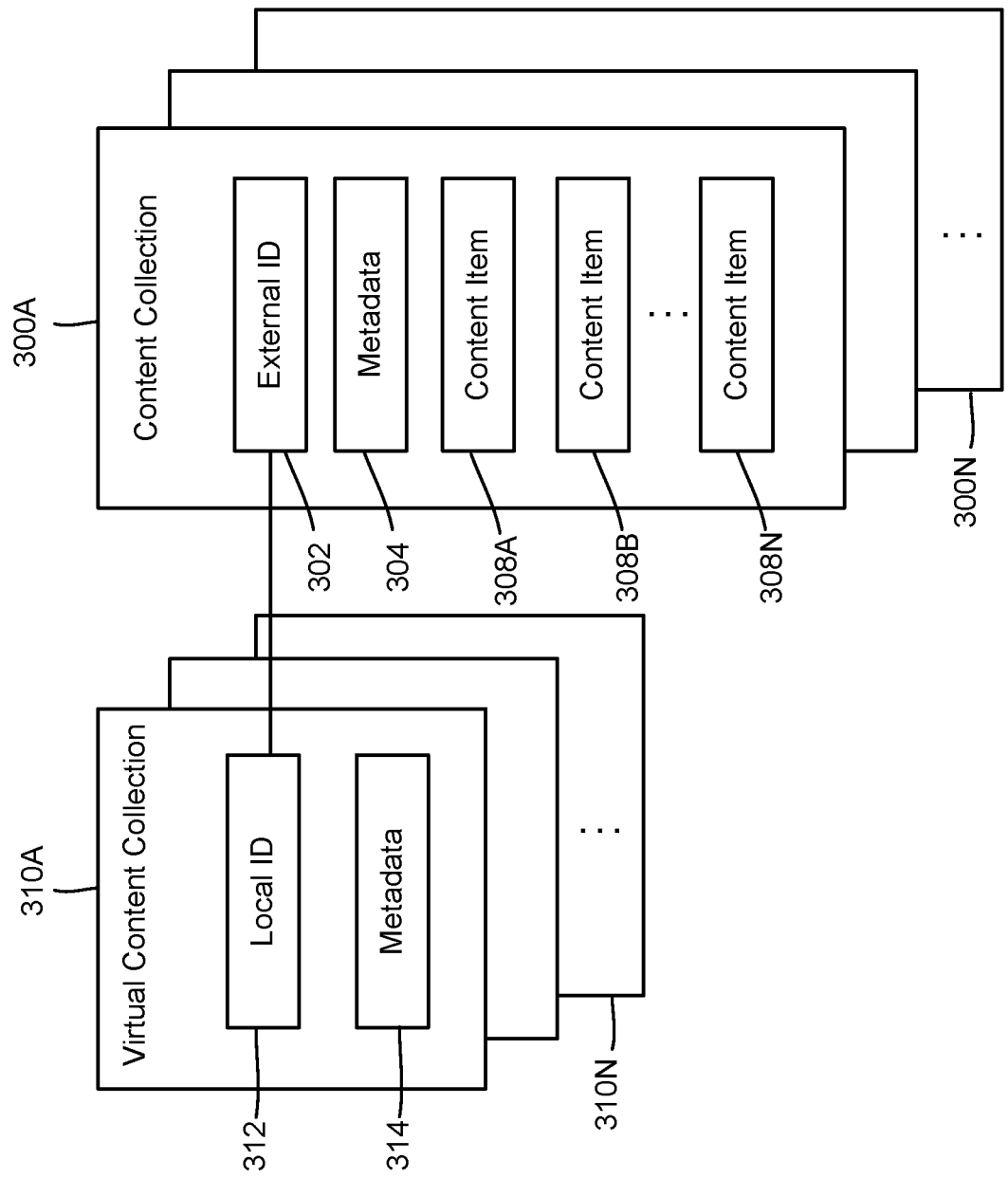
FIG. 3 shows an example of external data together with a proxy entity representing the external data, according to some implementations.

FIG. 3 shows an example of external data together with a proxy entity representing the external data, according to some implementations. In FIG. 3, the external data includes a set of content collections 300A to 300N. Each content collection 300 is maintained by a first computer system (e.g., computer system 130) and is represented locally in a separate computer system (e.g., computer system 110) by a corresponding virtual content collection 310. For instance, each of the virtual content collections 310A to 310N may be stored in a database operated by the computer system 110 as a proxy entity. As shown in FIG. 3, the content collection 300A includes an external ID 302 that is linked to a local ID 312 of the virtual content collection 310A. The content collection 300A further includes metadata 304 and a set of content items 308A to 308N. A content item 308 can be an electronic document, an audio file, a video file, a webpage, an interactive presentation (e.g., an online quiz), or other type of digital content. The metadata 304 describes the content collection 300A and, in some instances, may include a description of individual content items 308. For example, the metadata 304 may include a name of the content collection 300A, a short description of the content collection 300A, identify a creator of or contributor to the content collection 300A, a list of skills that can be learned using the content collection 300A, and/or other information relating to the content collection 300A. The external ID 302 may be included as part of the metadata 304. The virtual content collection 310A includes its own metadata 314, which may be derived from the metadata 304 of the content collection 300A. The metadata 304 and the metadata 314 may be identical or substantially identical. Alternatively, the metadata 314 may only include a subset of the metadata 304. The metadata 314 may also include information specific to the virtual content collection 310A, for example, a version number and/or a timestamp indicating when the virtual content collection 310A was created or last modified. Likewise, the metadata 304 can include a version number, a timestamp, or other information specific to the content collection 300A.

Figure 4:
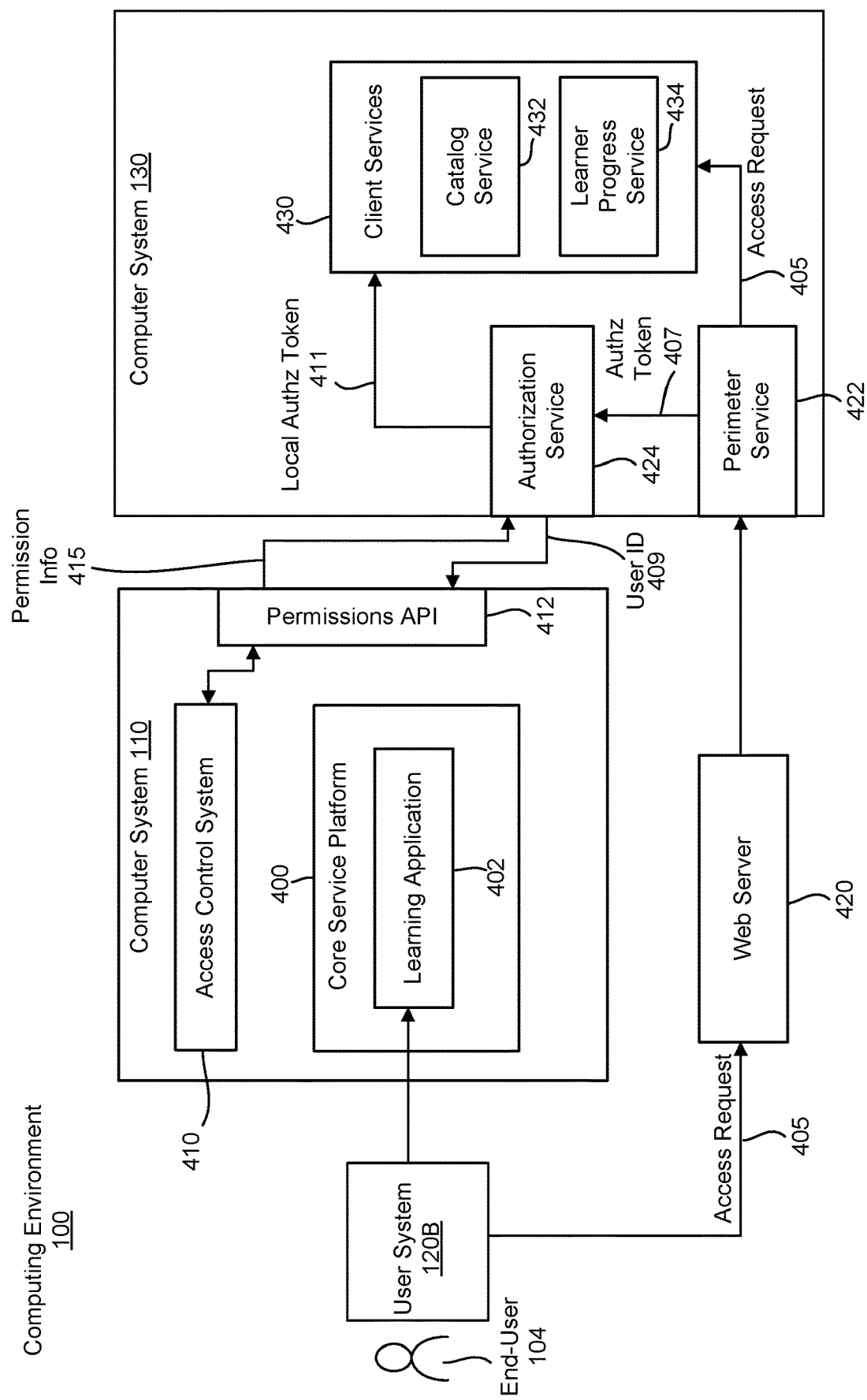
FIG. 4 shows a block diagram with runtime components of an example computing environment, according to some implementations.

FIG. 4 shows a block diagram with runtime components of the computing environment 100, according to some implementations. The runtime components are distributed across various computer systems and devices, including the computer system 110, the computer system 130, and the user system 120B, and are operated in connection with providing a user such as the end-user 104 with access to external data maintained by the computer system 130. In the example of FIG. 4, the external data includes learning resources accessed through a learning application 402. The learning application 402 can be part of a core service platform 400 operated by the computer system 110 and may therefore correspond to one of the core applications 112 in FIG. 1. The end-user 104 may interact with the learning application 402 through user system 120B, e.g., using a web browser or other client application. Functionality provided by the learning application 402 may include, for example, presenting the end-user 104 with a list of learning resources (e.g., learning modules) that the end-user has permission to access, providing web links to access such learning resources, and tracking user progress through learning resources previously accessed by the end-user.

Over the course of user interaction with the learning application 402, there may be times when learning resources maintained by the computer system 130 and/or information about such learning resources are made accessible to the user system 120B. For instance, the end-user 104 may request a list of online courses that the end-user can take or enroll in, or the end-user may request to be presented with a report summarizing their progress through courses previously taken. Access to such data can be provided through one or more client services 430 hosted by the computer system 130. For example, the client services 430 can include a catalog service 432 and a learner progress service 434. The catalog service 432 is configured to maintain an online catalog of learning resources that are available and information on how to access the learning resources (e.g., web links to the learning resources). The learner progress service 434 is configured to monitor the end-user's learning progress and, in some implementations, can maintain a history of learning resources accessed by the end-user along with an indication of user progress (e.g., percentage of a learning module completed).

The learning application 402 does not have direct access to the learning resources or other data that is available to the client services 430. Accordingly, in response to determining that such data is to be accessed, the learning application 402 may direct the user system 120B to send an access request 405 to a web server 420 that is in communication with the computer system 130. The access request 405 includes an authorization (authz) token 407 (e.g., an OAuth2 token). The authorization token 407 can be generated by an access control system 410 of the computer system 110 for use with the access request 405 and after the end-user 104 has been authenticated with the computer system 110, e.g., based on a username, password, and/or other user credentials. The web server 420 may optionally extract the authorization token 407 from the access request 405 and forward the authorization token 407 to a perimeter service 422 running on the computer system 130. Alternatively, the web server 420 can forward the entire access request 405. In some instances, the authorization token 407 may be generated by the web server 420 instead of the access control system 410. For example, the web server 420 may be configured to present the end-user 104 with a login page requesting input of user credentials and to generate the authorization token 407 after authenticating the user supplied credentials against stored credentials.

The authorization token 407 includes a user ID 409. However, the authorization token 407 does not indicate the access permissions of the end-user 104 and cannot be directly used to access data maintained by the computer system 130. To determine the end-user's access permissions, the perimeter service 422 sends the authorization token 407 to an authorization service 424. The authorization service 424 extracts the user ID 409 from the authorization token 407 and sends the user ID 409 to the access control system 410 through a permissions API 412 of the computer system 110. The authorization service 424 is an internal service of the computer system 130 and is configured to determine whether to grant or deny access by users to computing resources (e.g., learning resources) maintained by the computer system 130. In some implementations, the authorization service 424 may also be configured with authentication capabilities.

The authorization service 424 sends the user ID 409 to the access control system 410 in order to request permission information for the end-user. Access control system 410 may then use the user ID 409 to determine, through a lookup operation, all permission sets that have been assigned to the user associated with the user ID 409, i.e., end-user 104. As discussed above, permission sets can be configured relative to proxy entities. Therefore, the permission sets may be stored in association with and/or contain references to the IDs of the proxy entities. Since the computer system 130 may not recognize the IDs of the proxy entities, the access control system 410 converts the permission sets into permission information 415 that references the IDs of the corresponding external data entities, e.g., IDs assigned by computer system 130 to learning resources. The access control system 410 can generate the permission information 415 using the ID mappings 113. The access control system 410 sends the permission information 415 to the computer system 130 through the permissions API 412. In this manner, the access control system 410 informs the computer system 130 about access permissions of the end-user 104.

The computer system 130 can receive the permission information 415 as part of a response to the request from the authorization service 424. After receiving the permission information 415 through the permissions API 412, the authorization service 424 uses the permission information 415 to generate a local authorization token 411 (e.g., a JSON Web Token (JWT)) describing the end-user's access permissions. The local authorization token 411 is an authorization token recognized by components within the computer system 130 such as the client services 430. Accordingly, the authorization service 424 can communicate the local authorization token 411 to each of the client services to inform the client services about the end-user's access permissions. The authorization service 424 may, for example, send separate copies of the local authorization token 411 to the catalog service 432 and the learner progress service 434.

After receiving the local authorization token 411, a client service can analyze the local authorization token to determine the end-user's access permissions and to fulfill an access request in accordance with the end-user's access permissions. For instance, the access request 405 may be a request for a list of learning resources the end-user 104 is permitted to access, in which case the perimeter service 422 can forward the access request to the catalog service 432. Alternatively, the access request 405 may be a request for information about the end-user's learning progress, in which case the perimeter service 422 can forward the access request to the learner progress service 434. In general, whenever a service running within the computer system 130 needs to determine what permissions a user has, the service can request or be provided with a copy of the local authorization token. The local authorization token 411 can be cached, e.g., by the authorization service 424, for reuse with a subsequent access request. However, the local authorization token typically has a short lifetime, e.g., several minutes. Further, depending on the security settings of the computer system 130, the authorization service 424 may be configured to request updated access permissions from the computer system 110 for every incoming access request.

The computer system 110 and the computer system 130 can be periodically synchronized to update the ID mappings 113 and to ensure that each external data entity has a corresponding proxy entity or, conversely, that each proxy entity has a corresponding external data entity. Additionally, the computer system 130 can operate as the sole source of truth. If the computer systems 110 and 130 go out of sync, the external data 132 can be treated as authoritative. For example, referring to FIG. 2, if the external data entity 232 is deleted without also updating or deleting the ID mapping 213, the permission set 215, and the proxy entity 216, the user's permission to access the external data entity 232 will have no effect because the component generating the local authorization token 411 may recognize that the external data entity 232 no longer exists and, accordingly, generate a local authorization token that does not indicate any permissions relative to the external data entity 232. Alternatively or additionally, a component consuming the local authorization token 411 (e.g., one of the client services 430) may recognize that the external data entity 232 no longer exists and, accordingly, ignore any permissions relating to the external data entity 232 that are indicated by the local authorization token.

Figure 5:
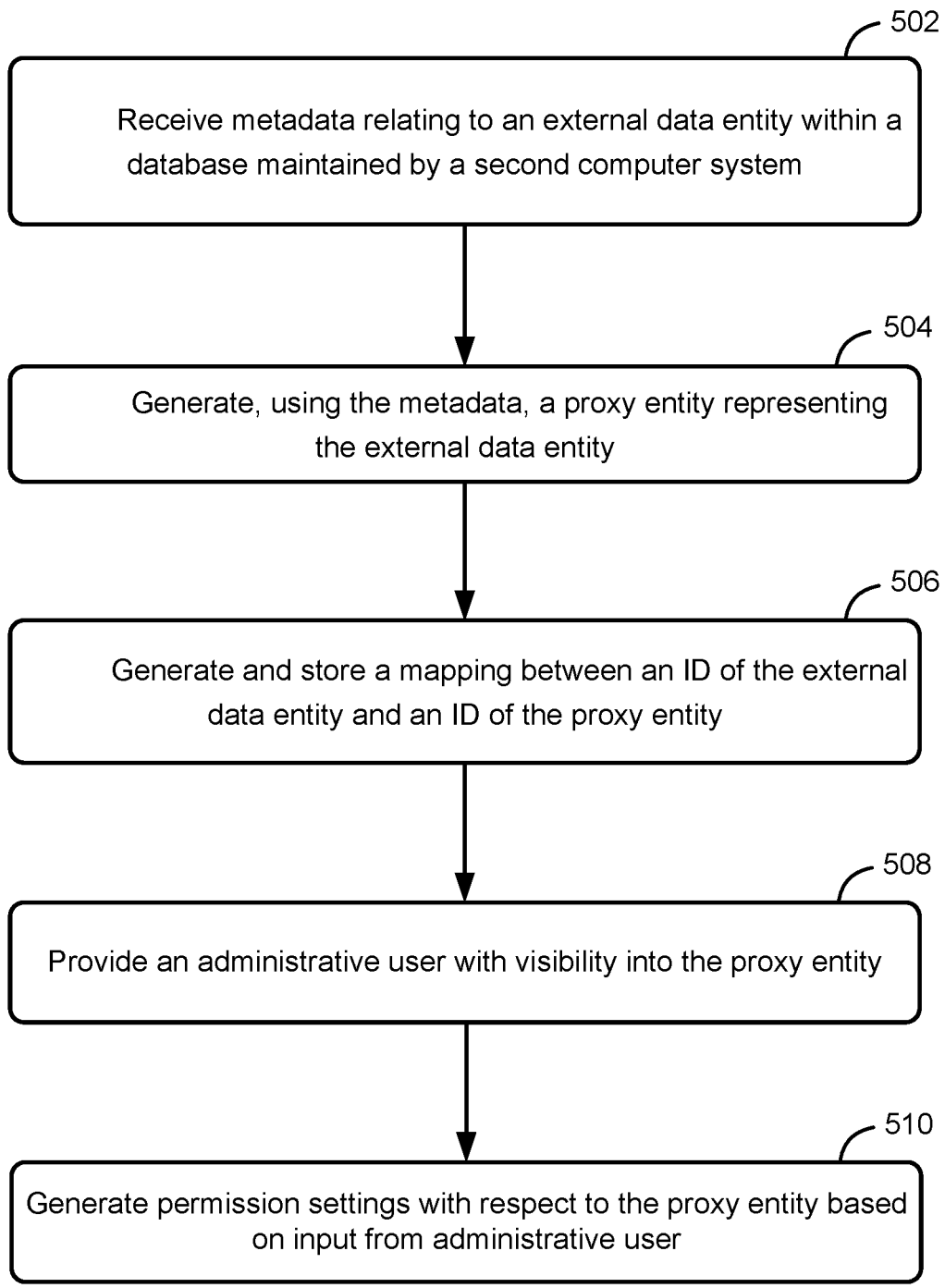
FIG. 5 shows a flow diagram of a process for generating permission settings, according to some implementations.

FIG. 5 shows a flow diagram of a process 500 for generating permission settings, according to some implementations. The process 500 can be performed by one or more processors of a first computer system configured with access control capabilities, such as the computer system 110 of FIG. 1.

At 502, the first computer system receives metadata relating to an external data entity within a database maintained by a second computer system (e.g., computer system 130). The external data entity includes one or more data records and may, in some instances, be a content collection. The metadata includes an ID of the external data entity and may further include descriptive information about the external data entity. In some instances, the first computer system may receive the metadata from the second computer system in automated response to instantiation of the external data entity within a database maintained by the second computer system. The instantiation of the external data entity can be initiated by the same administrator who configures permissions in block 510 (described below). For example, the administrator 102 may have the ability to create data records within the database maintained by the computer system 130. Alternatively, the external data entity may have been created by a different user. For example, in response to a request from an end-user to create a new content collection, the content collection may be instantiated in the database maintained by the second computer system, but may not be capable of being modified or otherwise accessed by end-users until permissions have been configured for the content collection. The second computer system may be configured to alert the first computer system whenever an external data entity is created or deleted.

In some instances, the first computer system may receive part of the metadata through manual input from an administrator. For example, the access control application 114 may permit the administrator 102 to define a content collection before the content collection is instantiated in the database maintained by the second computer system. As part of defining the content collection, the administrator 102 may specify a name of the content collection, provide a text description of the content collection, and/or configure other attributes of the content collection that are then communicated to the second computer system to instantiate the content collection.

At 504, the first computer system uses the metadata received in 502 to generate a proxy entity representing the external data entity. Specifically, the first computer system can incorporate at least part of the metadata received in 502 into a data record corresponding to the proxy entity. For example, the proxy entity may share the same name as the external data entity and can include a short description of the contents of the external data entity. When the proxy entity is generated, the first computer system can assign an ID to the proxy entity. The ID uniquely identifies the proxy entity within the first computer system and can be in a different format than the ID of the external data entity.

At 506 the first computer system generates and stores a mapping between the ID of the external data entity and the ID of the proxy entity. The mapping can be stored separately from the proxy entity, e.g., in a mapping table. Alternatively, in some implementations, the ID of the external data entity may be included as an entry within the proxy entity.

At 508, the first computer system provides an administrative user with visibility into the proxy entity. For example, the computer system 110 may include the proxy entity in a list of data entities that the administrator 102 can configure permissions for, and the list may be presented to the administrator 102 through a user interface of the access control application 114.

At 510, the first computer system generates permission settings with respect to the proxy entity based on input from the administrative user. For instance, the administrator 102 may configure one or more permission sets for the proxy entity and assign each permission set to one or more end-users. Because the ID of the proxy entity is mapped to the ID of the external data entity, the permission sets that apply to the proxy entity also apply to the external data entity. The administrator 102 need not access the external data entity or its contents when configuring the one or more permission sets. The first computer system can store the permission sets in association with the users to whom the permission sets have been assigned. For example, a permission set may be linked to a user through their user ID or through one or more attributes in their user profile, such as the user's role or job function.

Figure 6:
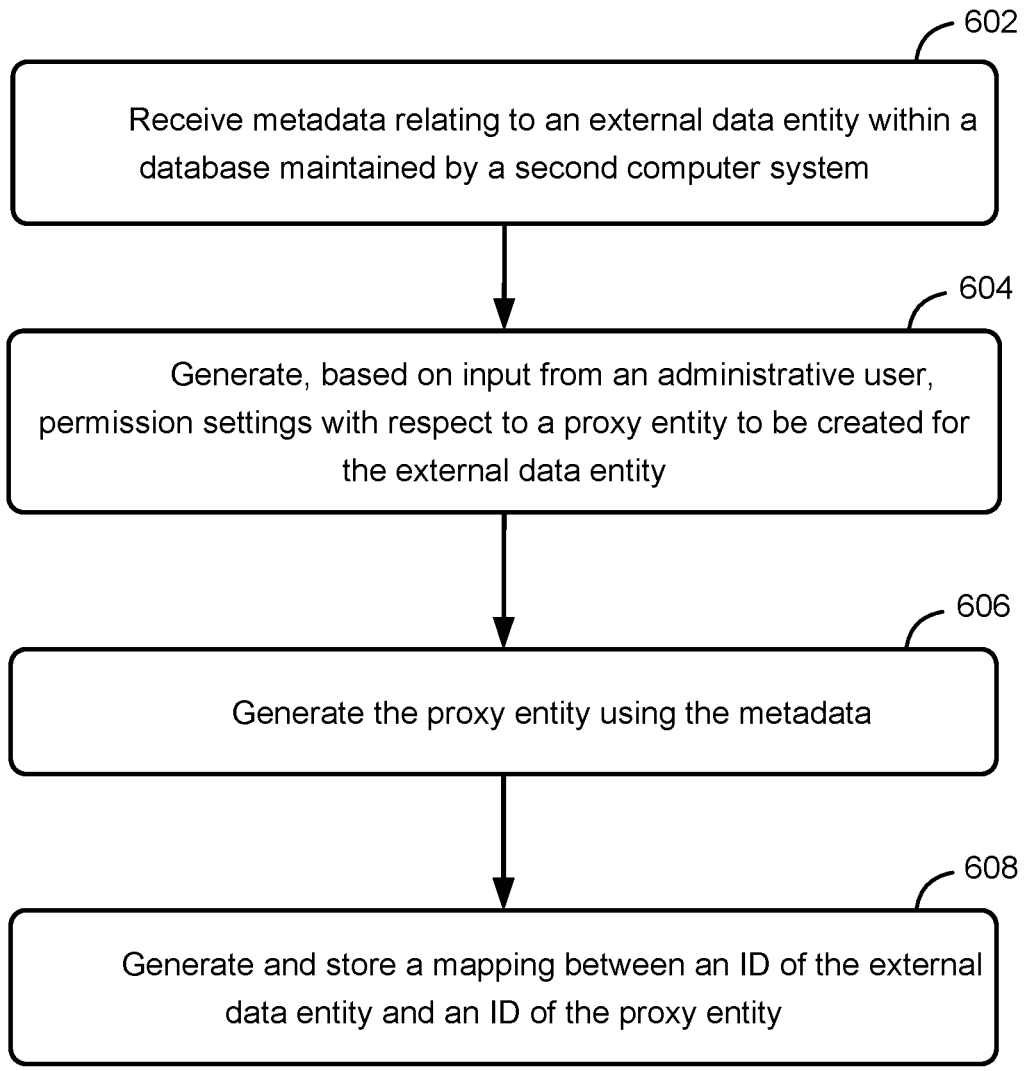
FIG. 6 shows a flow diagram of a process for generating permission settings, according to some implementations.

FIG. 6 shows a flow diagram of a process 600 for generating permission settings, according to some implementations. The process 600 can be performed by one or more processors of a first computer system configured with access control capabilities, such as the computer system 110 of FIG. 1.

At 602, the first computer system receives metadata relating to an external data entity within a database maintained by a second computer system (e.g., computer system 130). The functionality in block 602 can be implemented in the same manner as block 502 of FIG. 5.

At 604, the first computer system generates permission settings based on input from an administrative user, e.g., the administrator 102. The permission settings generated in 604 may include one or more permission sets and are generated with respect to a proxy entity that is to be created for the external data entity. Unlike the process 500 in FIG. 5, the permission settings are generated before the proxy entity.

For example, the administrator 102 may create a permission set in association with a new local ID that will be assigned to a proxy entity being created for the external data entity. In some cases, a permission set may even be defined before a corresponding external data entity is instantiated.

At 606, the first computer system generates the proxy entity using the metadata received in 602. Similar to the functionality in block 504 of FIG. 5, the proxy entity generated in 606 may share at least some of the metadata relating to the external data entity.

At 608, the first computer system generates and stores a mapping between an ID of the external data entity and an ID of the proxy entity. The mapping can be stored separately from the proxy entity, e.g., in a mapping table. Alternatively, in some implementations, the ID of the external data entity may be included as an entry within the proxy entity.

Figure 7:
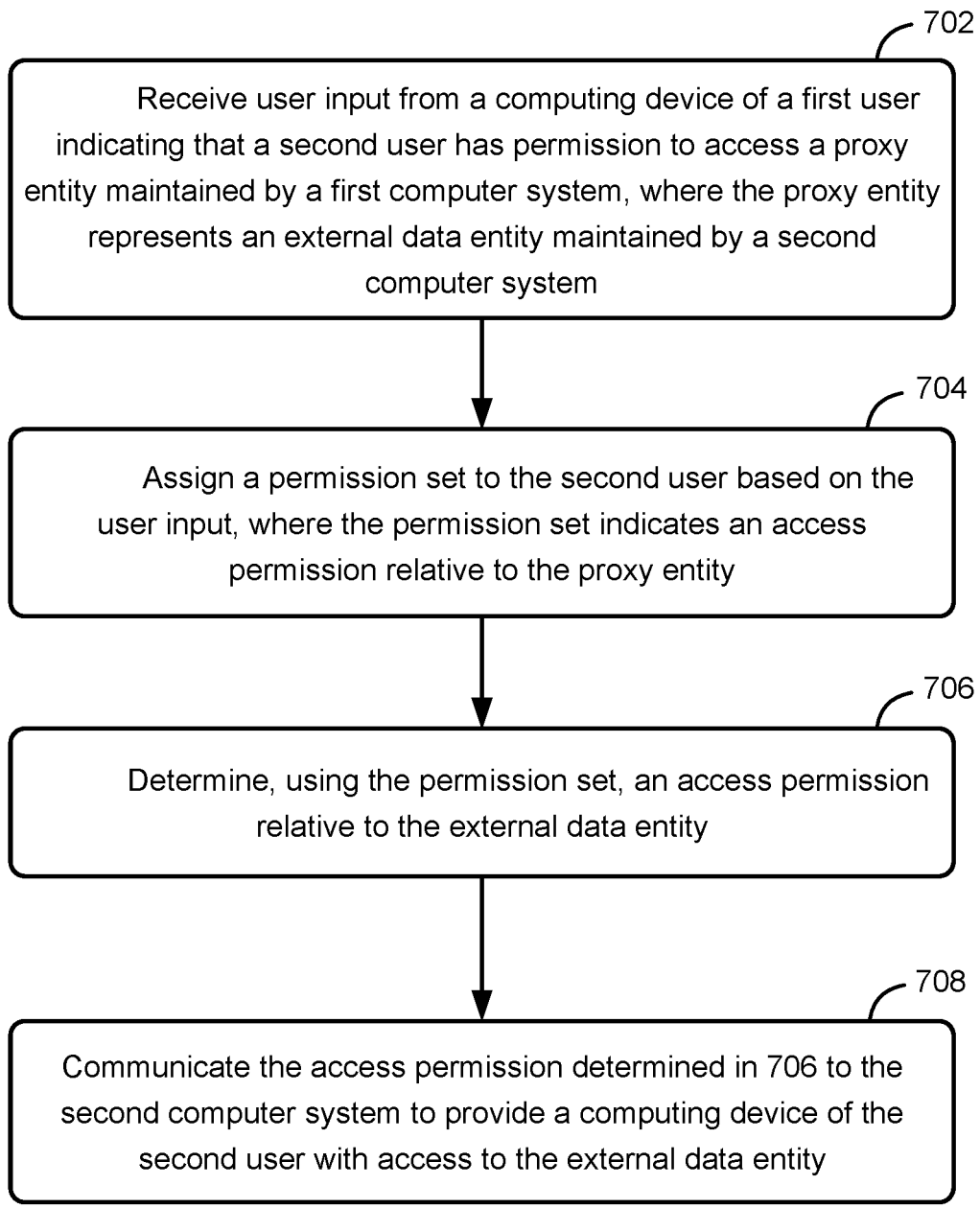
FIG. 7 shows a flow diagram of a process for applying permission settings to grant access to external data, according to some implementations.

FIG. 7 shows a flow diagram of a process 700 for applying permission settings to grant access to external data, according to some implementations. The process 700 can be performed by one or more processors of a first computer system with access to stored permission information, such as the computer system 110 of FIG. 1. The first computer system is communicatively coupled to a second computer system (e.g., computer system 130) that is external to the first computer system. The second computer system is configured to enforce access permissions based on the stored permission information.

At 702, the first computer system receives user input from a computing device of a first user. The user input indicates that a second user has permission to access a proxy entity maintained by the first computer system. The proxy entity is a local representation of an external data entity maintained by the second computer system. The proxy entity may include metadata relating to the external data entity without including the underlying data of the external data entity. In some instances, the proxy entity may represent a container object (e.g., a content collection) that contains multiple data records. The user input in block 702 can be received through a user interface of an access control application, e.g., access control application 114.

At 704, the first computer system assigns a permission set to the second user based on the user input from the first user. The permission set indicates an access permission relative to the proxy entity. Depending on the user input in block 702, the permission set may be assigned exclusively to the second user or to a group of users. The assignment of the permission set may involve storing an association between the permission set and a user ID or some other attribute of the second user.

At 706, the first computer system determines, using the permission set that was assigned to the second user, an access permission relative to the external data entity. The determination in 706 may occur in response to a request from the second computer system for permission information. As described above in connection with FIG. 4, such a request may include a user ID of a user who is the subject of the request, in this example, the second user. To determine the access permission in block 706, the first computer system may look up all permission sets that have been assigned to the user having the user ID. Thus, the first computer system may determine that the user ID is associated with the permission set that was assigned in block 704. For each permission set assigned to the user, the first computer system may reference a stored mapping between an ID of a proxy entity associated with the permission set and an ID of a corresponding external data entity.

At 708, the first computer system communicates the access permission determined in block 706 to the second computer system to provide a computing device of the second user with access to the external data entity. In this manner, the first computer system informs the second computer system about the second user's right to access the data contained in the external data entity.

Figure 8A:
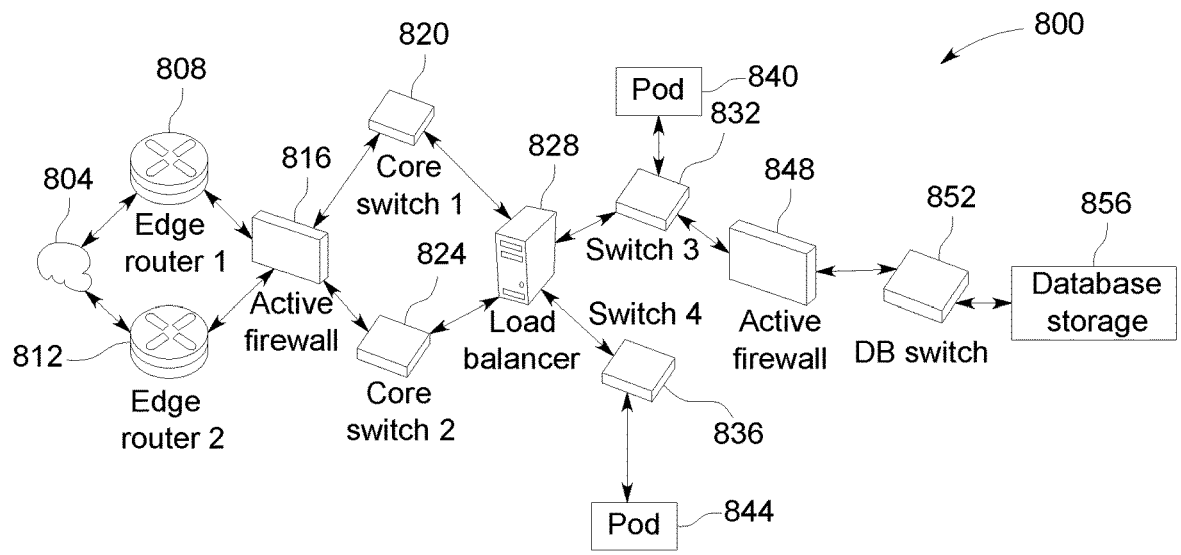
FIG. 8A shows a system diagram illustrating architectural components of an applicable environment, in accordance with some implementations.

FIG. 8A shows a system diagram illustrating architectural components of an on-demand service environment 800, in accordance with some implementations. For instance, the on-demand service environment 800 may correspond to an implementation of computing environment 100 in FIG. 1. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
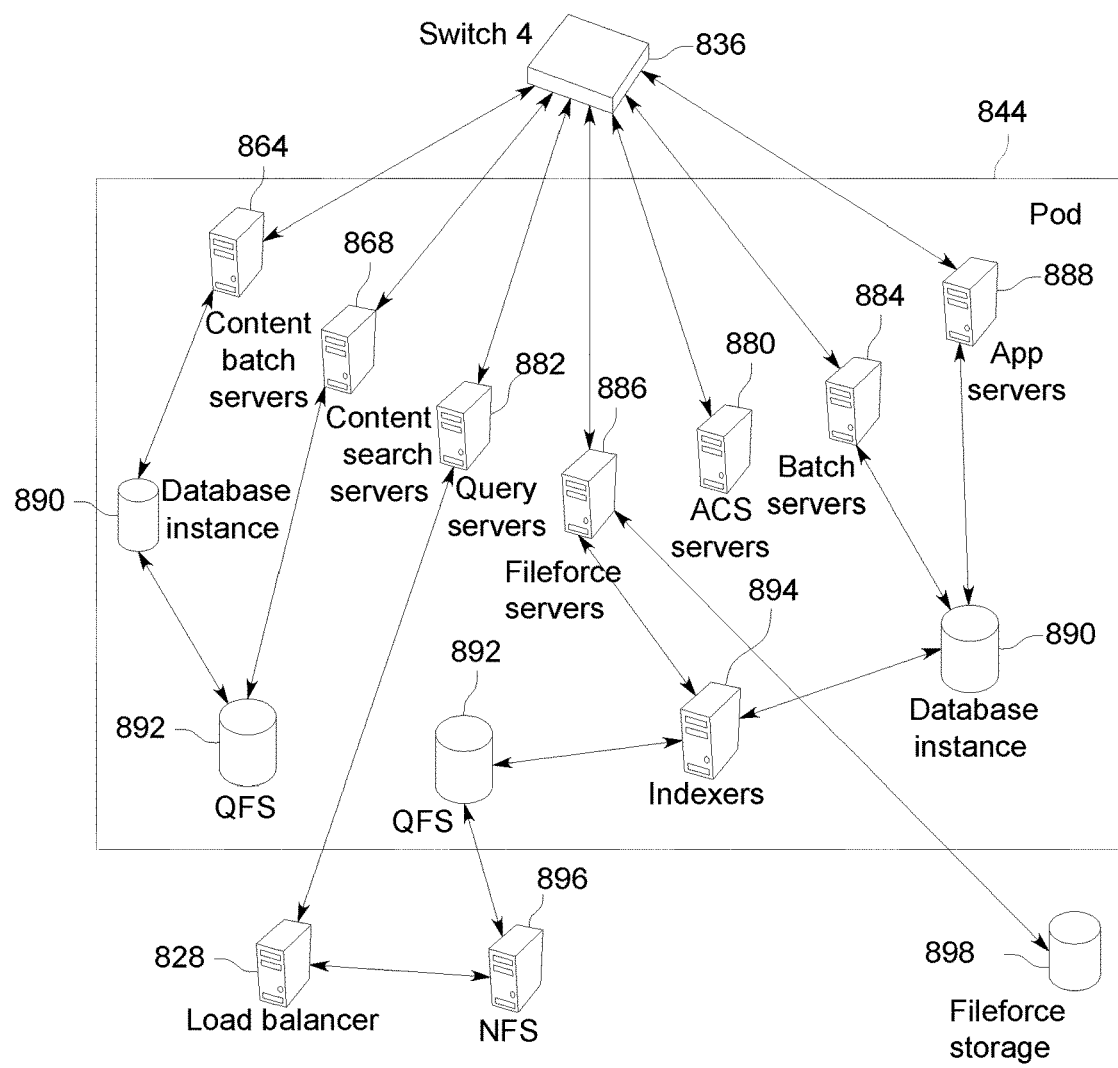
FIG. 8B shows a system diagram further illustrating architectural components of an applicable environment, in accordance with some implementations.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some implementations of an on-demand service environment may include anywhere from one to many devices of each type. Also, the on-demand service environment need not include each device shown in FIGS. 8A and 8B or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some implementations, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more implementations, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand service environment 800. The core switches 820 and 824 may be configured as network bridges that quickly route data between different components within the on-demand service environment. In some implementations, the use of two or more core switches 820 and 824 may provide redundancy and/or reduced latency.

In some implementations, the pods 840 and 844 may perform the core data processing and service functions provided by the on-demand service environment. Each pod may include various types of hardware and/or software computing resources. An example of the pod architecture is discussed in greater detail with reference to FIG. 8B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some implementations, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one implementation. The pod 844 may be used to render services to a user of the on-demand service environment 800. In some implementations, each pod may include a variety of servers and/or other systems. The pod 844 includes one or more content batch servers 864, content search servers 868, query servers 882, Fileforce servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may handle requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 886 may manage requests for information stored in the Fileforce storage 898. The Fileforce storage 898 may store information such as documents, images, and basic large objects (BLOBs). By managing requests for information using the Fileforce servers 886, the image footprint on the database may be reduced.

The query servers 882 may be used to retrieve information from one or more file systems. For example, the query servers 882 may receive requests for information from the app servers 888 and then transmit information queries to network file systems (NFS) 896 located outside the pod. The pod 844 may share a database instance 890 configured as a multi-tenant environment in which different organizations share access to the same database. Additionally, services rendered by the pod 844 may require various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs. For some implementations, the QFS 892 may be an open source file system available from Sun Microsystems® of Santa Clara, California. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the NFS 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed. In some implementations, queries from the query servers 882 may be transmitted to the NFS 896 via the load balancer 828, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without requiring an additional database call. In some implementations, database information may be transmitted to the indexer 894. Indexer 894 may provide an index of information available in the database 890 and/or QFS 892. The index information may be provided to Fileforce servers 886 and/or the QFS 892.

Figure 9:
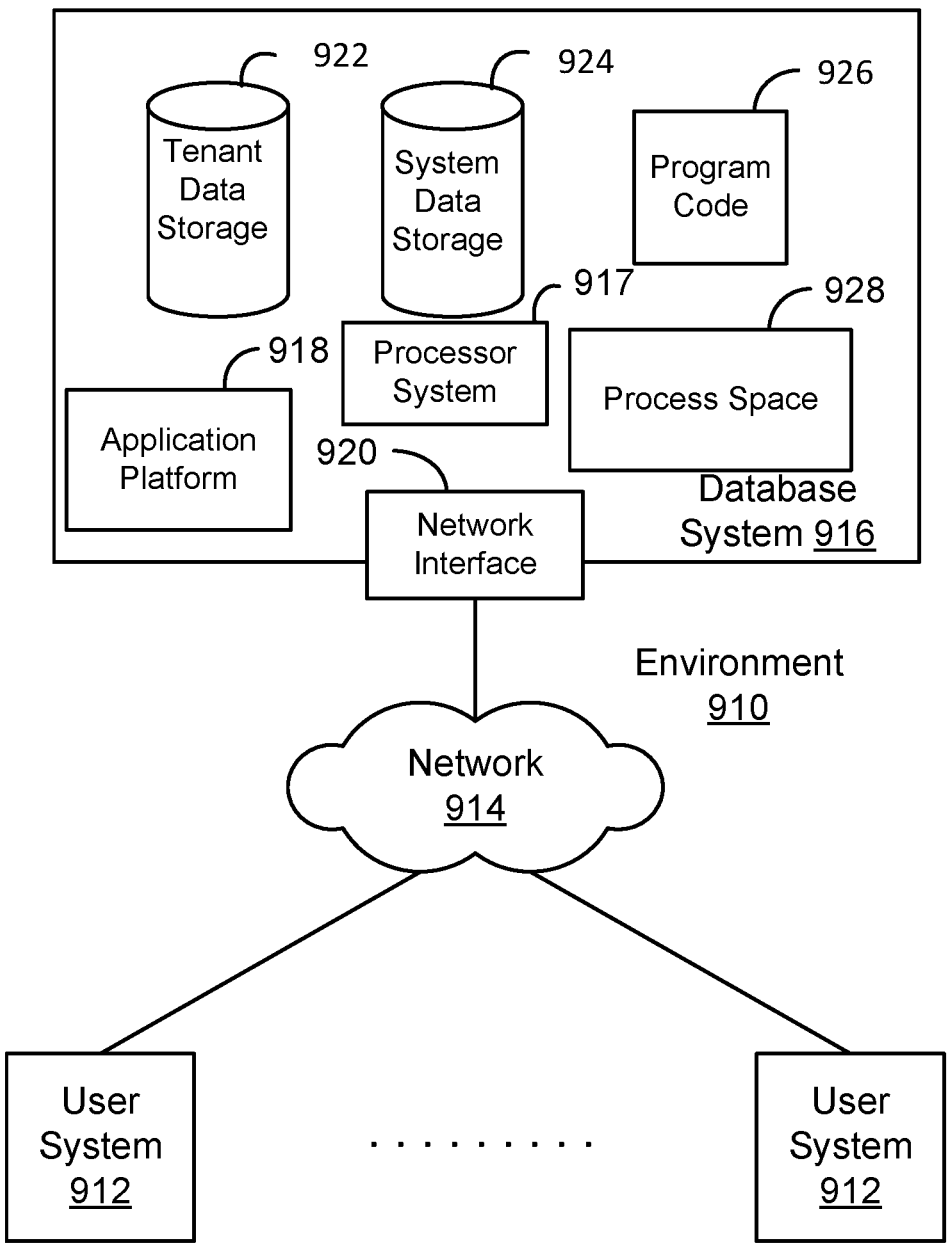
FIG. 9 shows a system diagram illustrating the architecture of a multi-tenant database environment, in accordance with some implementations.
Figure 10:
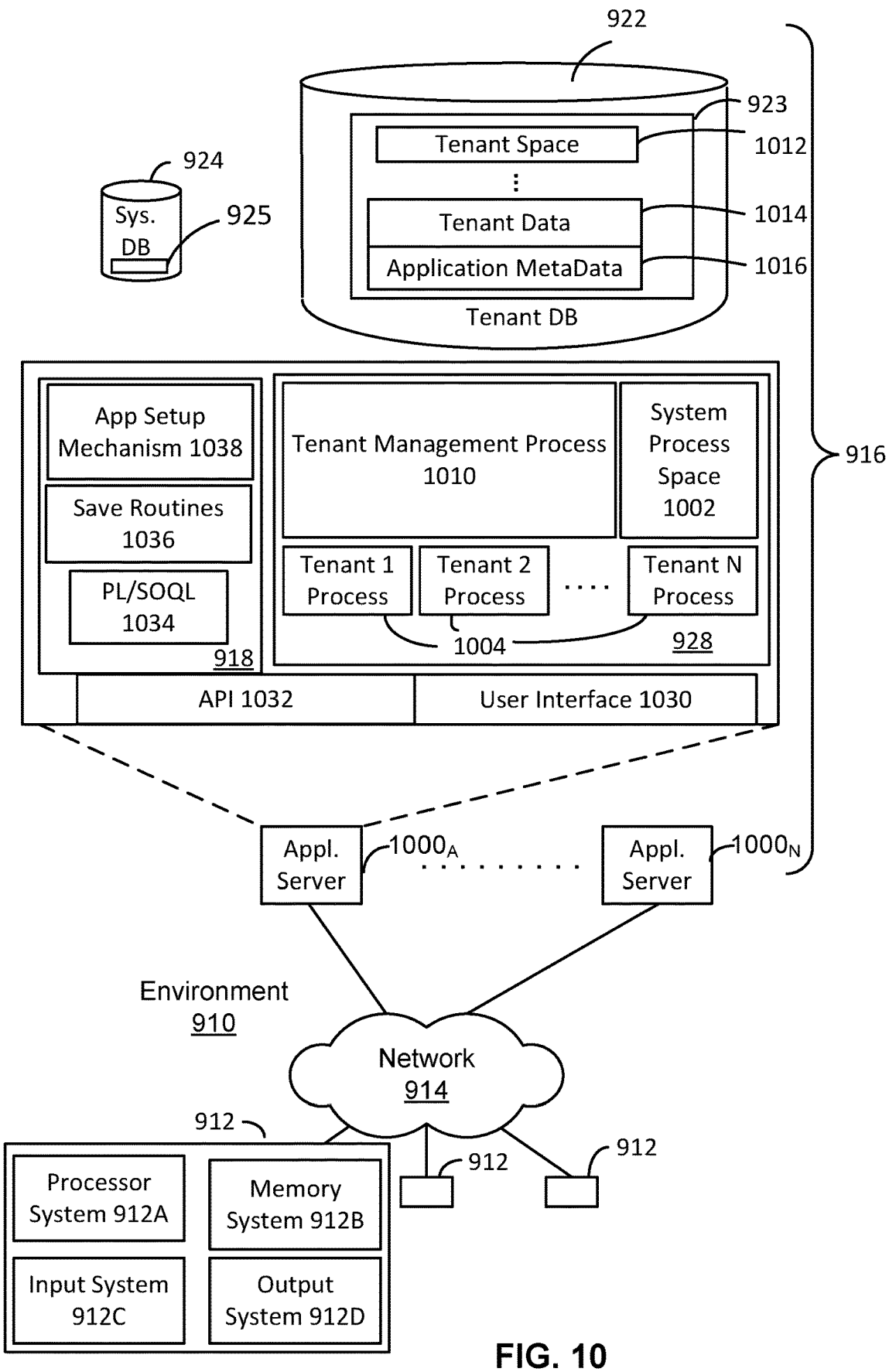
FIG. 10 shows a system diagram further illustrating the architecture of a multi-tenant database environment, in accordance with some implementations.

FIG. 9 shows a block diagram of an environment 910 wherein an on-demand database service might be used, in accordance with some implementations. Environment 910 includes an on-demand database service 916. User system 912 may be any machine or system that is used by a user to access a database user system. For example, any of user systems 912 can be a handheld computing system, a mobile phone, a laptop computer, a workstation, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some implementations, system 916, shown in FIG. 9, implements a web-based customer relationship management (CRM) system. For example, in some implementations, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some implementations, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for carrying out disclosed operations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some implementations, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some implementations. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 1000A-1000N, system process space 1002, tenant process spaces 1004, tenant management process space 1010, tenant storage area 1012, user storage 1014, and application metadata 1016. In other implementations, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 1034 that provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 1000 might be coupled via the network 914 (e.g., the Internet), another application server 1000 might be coupled via a direct network link, and another application server 1000 might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain implementations, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some implementations, therefore, an interface system implementing a load balancing function (e.g., an F5 Big-IP load balancer) is communicably coupled between the application servers 1000 and the user systems 912 to distribute requests to the application servers 1000. In some implementations, the load balancer uses a least connections algorithm to route user requests to the application servers 1000. Other examples of load balancing algorithms, such as round robin and observed response time, also can be used. For example, in certain implementations, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain implementations, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A computer-implemented method comprising:
   receiving, by a first computer system, user input from a computing device of a first user, the user input indicating that a second user has permission to access a proxy entity maintained by the first computer system, wherein the proxy entity represents an external data entity maintained by a second computer system, wherein the external data entity is stored in a database accessible to the second computer system but inaccessible to the first computer system;
   assigning, by the first computer system, a permission set to the second user based on the user input;
   determining, by the first computer system and using the permission set, an access permission relative to the external data entity, wherein the determining of the access permission relative to the external data entity comprises looking up a first stored mapping in response to a request for information about permissions assigned to the second user, the first stored mapping linking an identifier of the proxy entity to an identifier of the external data entity, the first stored mapping being one of a plurality of stored mappings periodically updated in response to synchronization of the first and second computer systems to link identifiers of proxy entities to corresponding identifiers of external data entities; and
   communicating, by the first computer system, the access permission relative to the external data entity to the second computer system, wherein the access permission relative to the external data entity is processed by the second computer system to generate an authorization token controlling access to the external data entity by a computing device of the second user, the authorization token configurable to have:
   a first state indicating permission to access the external data entity, and
   a second state not indicating permission to access the external data entity in response to detecting that the external data entity has been deleted without updating or deleting the first stored mapping.

2. The computer-implemented method of claim 1, wherein the identifier of the proxy entity is assigned by the first computer system, and wherein the identifier of the external data entity is assigned by the second computer system.

3. The computer-implemented method of claim 1, wherein the request for information about permissions assigned to the second user is generated through an authorization service running on the second computer system.

4. The computer-implemented method of claim 1, wherein the request for information about permissions assigned to the second user includes a user identifier, the method further comprising:
   determining, by the first computer system, that the user identifier included in the request is associated with the permission set assigned to the second user.

5. The computer-implemented method of claim 1, wherein the external data entity is a container object for a plurality of data records that are individually accessible.

6. The computer-implemented method of claim 5, wherein the proxy entity includes metadata describing the plurality of data records.

7. The computer-implemented method of claim 1, further comprising:
- executing, by the first computer system, a software application through which the external data entity is accessed by the computing device of the second user under an appearance of having been provided by the first computer system.

8. A computer system comprising:
- one or more processors; and
- memory storing instructions that, when executed, cause the one or more processors to:
- receive user input from a computing device of a first user, the user input indicating that a second user has permission to access a proxy entity maintained by the computer system, wherein the proxy entity represents an external data entity maintained by a second computer system, wherein the external data entity is stored in a database accessible to the second computer system but inaccessible to the computer system;
- assign a permission set to the second user based on the user input;
- determine, using the permission set, an access permission relative to the external data entity, wherein to determine the access permission relative to the external data entity, the one or more processors are configured to look up a first stored mapping in response to a request for information about permissions assigned to the second user, the first stored mapping linking an identifier of the proxy entity to an identifier of the external data entity, the first stored mapping being one of a plurality of stored mappings periodically updated in response to synchronization of the computer system and the second computer system to link identifiers of proxy entities to corresponding identifiers of external data entities; and
- communicate the access permission relative to the external data entity to the second computer system, wherein the access permission relative to the external data entity is processed by the second computer system to generate an authorization token controlling access to the external data entity by a computing device of the second user, the authorization token configurable to have:
- a first state indicating permission to access the external data entity, and
- a second state not indicating permission to access the external data entity in response to detecting that the external data entity has been deleted without updating or deleting the first stored mapping.

9. The computer system of claim 8, wherein the request for information about permissions assigned to the second user is generated through an authorization service running on the second computer system.

10. The computer system of claim 8, wherein the request for information about permissions assigned to the second user includes a user identifier, and wherein the one or more processors are configured to determine that the user identifier included in the request is associated with the permission set assigned to the second user.

11. The computer system of claim 8, wherein the external data entity is a container object for a plurality of data records that are individually accessible.

12. The computer system of claim 11, wherein the proxy entity includes metadata describing the plurality of data records.

13. The computer system of claim 8, wherein the one or more processors are configured to execute a software application through which the external data entity is accessed by the computing device of the second user under an appearance of having been provided by the computer system.

14. A non-transitory computer-readable medium storing program code, the program code including instructions executable by one or more processors of a computer system to:
- receive user input from a computing device of a first user, the user input indicating that a second user has permission to access a proxy entity maintained by the computer system, wherein the proxy entity represents an external data entity maintained by a second computer system, wherein the external data entity is stored in a database accessible to the second computer system but inaccessible to the computer system;
- assign a permission set to the second user based on the user input;
- determine, using the permission set, an access permission relative to the external data entity, wherein the determining of the access permission relative to the external data entity comprises looking up a first stored mapping in response to a request for information about permissions assigned to the second user, the first stored mapping linking an identifier of the proxy entity to an identifier of the external data entity, the first stored mapping being one of a plurality of stored mappings periodically updated in response to synchronization of the computer system and the second computer system to link identifiers of proxy entities to corresponding identifiers of external data entities; and
- communicate the access permission relative to the external data entity to the second computer system, wherein the access permission relative to the external data entity is processed by the second computer system to generate an authorization token controlling access to the external data entity by a computing device of the second user, the authorization token configurable to have:
- a first state indicating permission to access the external data entity, and
- a second state not indicating permission to access the external data entity in response to detecting that the external data entity has been deleted without updating or deleting the first stored mapping.

15. The non-transitory computer-readable medium of claim 14, wherein the identifier of the proxy entity is assigned by the computer system, and wherein the identifier of the external data entity is assigned by the second computer system.

16. The non-transitory computer-readable medium of claim 14, wherein the request for information about permissions assigned to the second user is generated through an authorization service running on the second computer system.

17. The non-transitory computer-readable medium of claim 14, wherein the request for information about permissions assigned to the second user includes a user identifier, wherein the program code includes further instructions executable by one or more processors of the computer system to:
- determine that the user identifier included in the request is associated with the permission set assigned to the second user.

18. The non-transitory computer-readable medium of claim 14, wherein the external data entity is a container object for a plurality of data records that are individually accessible.

19. The non-transitory computer-readable medium of claim 18, wherein the proxy entity includes metadata describing the plurality of data records.

20. The non-transitory computer-readable medium of claim 14, wherein the program code includes further instructions executable by one or more processors of the computer system to:
  execute a software application through which the external data entity is accessed by the computing device of the second user under an appearance of having been provided by the computer system.

* * * * *